Aug. 27, 1968  A. J. CAMPBELL ET AL  3,398,590
SIDE MOUNT OPERATOR FOR AWNING TYPE WINDOWS OR THE LIKE
Filed May 31, 1966  2 Sheets-Sheet 2

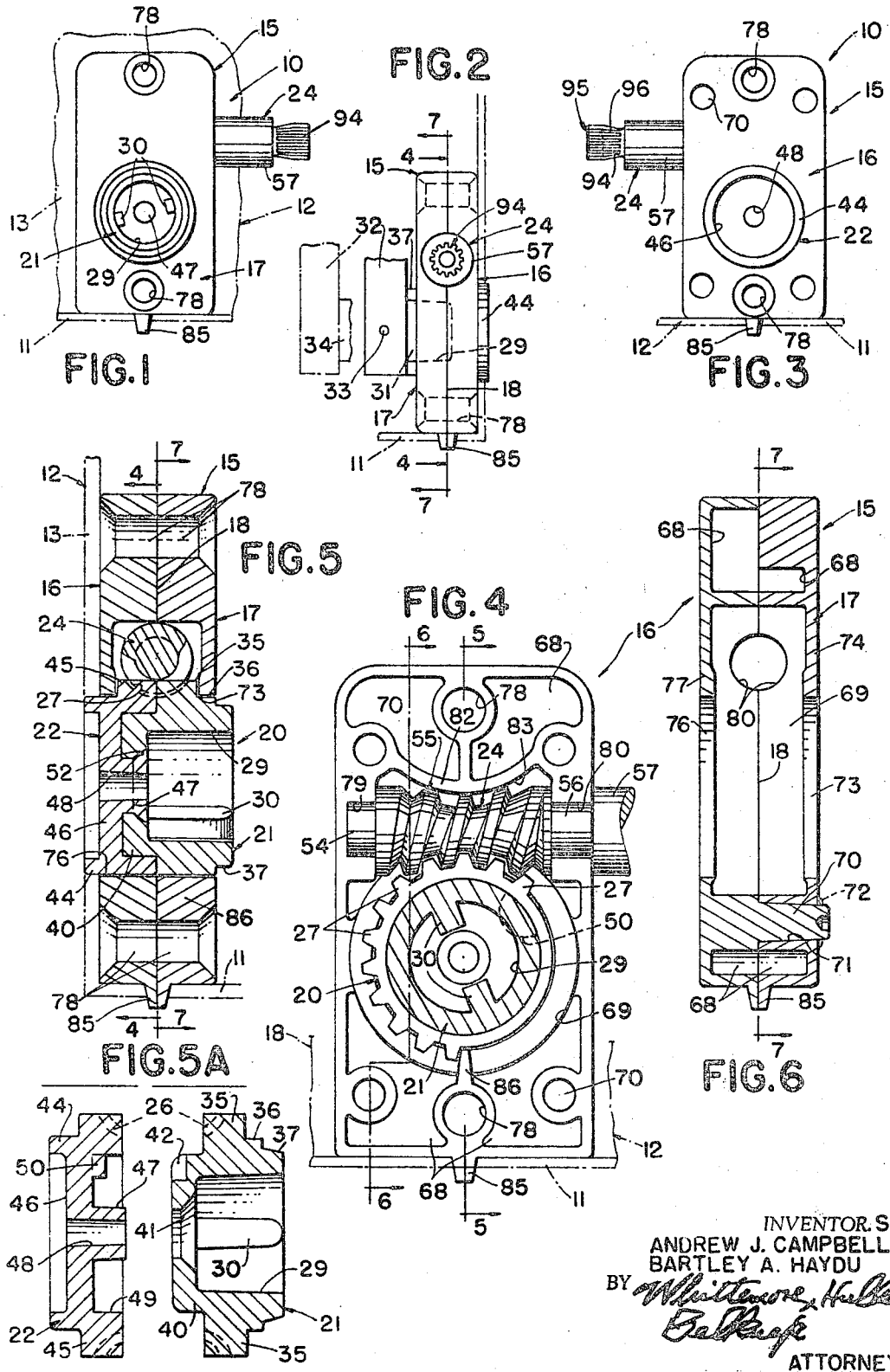

INVENTORS
ANDREW J. CAMPBELL
BARTLEY A. HAYDU
BY Whittemore, Hulbert
Belknap
ATTORNEYS

3,398,590
SIDE MOUNT OPERATOR FOR AWNING TYPE WINDOWS OR THE LIKE

Andrew J. Campbell, Southfield, and Bartley A. Haydu, Oak Park, Mich., assignors to Al-Craft Manufacturing Company, Troy, Mich., a corporation of Michigan
Filed May 31, 1966, Ser. No. 553,733
3 Claims. (Cl. 74—89.14)

ABSTRACT OF THE DISCLOSURE

A side mount type of operator for awning or like type windows is disclosed, in which an improved worm and worm gear operating unit is housed in a die-cast casing of two-part construction; whose parts flatwise engage one another centrally of the width of the casing. The operator also features a two-part, die-cast worm gear of a double-enveloping nature, of which the interfitted parts meet at a plane including the axis of rotation of a steel worm. The worm is backed-up at its concave throat by a convex surface integral with the casing.

---

The present invention relates to improvements in a manual operator for awning or equivalent pivotally mounted window panels, although it is to be understood that the improved operator may also be utilized in association with other generally similar panel members, especially such as are operated from one side of a window or related panel mounting frame.

It is an object of the invention to provide a side-mounted, manually actuable operator of this sort which is fabricated in substantially its entirety, save for a worm thereof, in the form of die castings of zinc, or other metal suited to the die casting procedure. More particularly, it is an object to provide a thus-constituted operator which is extremely compact in design, calling for the use of an absolutely minimal amount of metal, to the end of enabling an extremely low cost of production, insofar as the fabrication of component parts is concerned. The attaining of this underlying objective is also greatly contributed to by specific improved structural features of the parts, which make possible a very quick, easy and an inexpensive assembly thereof to complete the operator.

Another object is to provide an operator having a two-piece housing structure, including die cast housing and cover members, preferably of zinc or other light-weight and adequately inexpensive die-castable metal, which have improved means enabling them to be rigidly secured unitarily together, once worm and worm gear components are rotatively journaled therewithin, in a single operation. This operation involves the simultaneous staking of stud formations integral with one of the housing and cover halves and projecting through holes in the other half.

A further object is to provide an operator of the type described, in which the housing and cover members, as thus secured together by staking, serve as the sole means for maintaining the coacting worm gear and worm members in place in the housing, properly journaled and in proper meshing engagement with one another.

A still further object is to provide an operator in which, in one embodiment thereof, the worm gear is of two-part die cast construction. The pair of gear halves are of somewhat similar nature, being disposed in flat-wise, face-to-face meeting engagement with one another in a medial radial plane at 90° to the axis of the assembled gear. This plane is midway of the axial dimension of two combined sets of half gear teeth, which partial teeth meet in register and find completion as full arcuate worm gear teeth at the plane in question.

Pursuant to the invention, the two worm gear halves comprise a drive gear half, by which (in one embodiment) the composite gear is directly and drivingly connected to a pivoted window or equivalent panel, or to a set of such panels. The other worm gear component is a bearing gear half, by which the composite gear is rotatably piloted or located in a mating opening in a side upright of a window or equivalent frame.

The purpose of forming the worm gear in two halves or parts is to enable each gear half to twist readily out of the die of the die casting machine. The staking together of the housing and cover parts of the operator's housing structure in fixed meeting engagement with one another, serves in great measure to hold the worm gear halves together, just as the housing parts also journal the steel worm for proper meshing engagement with the die cast worm gear.

In further accordance with the invention, the driving and bearing members of the composite worm gear have mating means, preferably in the form of an integral projection on one thereof and a recess on the other thereof receiving this projection, to insure a proper circumferential register of the half-tooth gear formations on the respective gear halves; and these halves, as thus registered angularly, are rigidly held in fixed meeting engagement with one another, as by staking.

However, the invention also contemplates the production of the worm gear as an integral, one-piece die casting, in which case the gear teeth have horizontal draft through an axial side of the gear to permit separation from the casting machine mold or die halves. Pursuant to the invention, and as a double alternative, either a two-part or a unitary worm gear, either of which has teeth about only a part of its circumferential extent, or throughout its full 360° periphery, may be utilized in the operator, as any particular operational requirement may indicate.

In another important aspect of the invention, the worm gear and worm are of the double-enveloping type; and the housing or casing of the operator is internally formed to provide a convex arcuate surface adapted to exert lateral outward restraint on the worm in the direction of a common radius of itself and the worm gear, particularly when the operator is drawn up tightly in the final closing of the window or windows. With such a double-enveloping gear unit, the steel worm being radially backed up in the manner referred to, axial side thrust existing between the worm and gear is contained at the axial envelopment of the members, which is of particular importance in the case of a two-part gear tending to have its halves separated axially by such thrust; while the arcuate backing surface of the housing or casing takes the outward reactive thrust of the worm gear teeth on the worm, thus further opposing a separating force on the two-part gear, which in turn would represent a separating force on the housing and cover components of the casing structure of the operator.

Thus, the double-enveloping worm and gear unit, coupled with backing means afforded by the housing and cover of the operator, inherently strengthen the operator as a whole; and this is a valuable feature, considering the die cast nature of the dual part casing and worm gear components, and the fact that they are otherwise held together, respectively, only by staking.

In still another aspect of the invention, the steel worm of the operator, as its shaft projects externally of the casing or housing structure for operation by a hand handle or crank, is provided at its end with a broached spline formation of an improved sort to drivingly connect it to the crank. For this purpose, the splines are formed with a substantial radial and axially inward relief adjacent a bearing portion of the worm shaft, which relief greatly improves the broaching operation by which the end splining of the worm shaft is formed. That is, the usual relatively frequent replacing or reworking of the broach tooling is practically eliminated, along with machine down time occasioned thereby.

In further accordance with the invention, one embodiment thereof contemplates a direct take-off of operating power to the window panel or panels from a drive gear half of the worm gear, as through the agency of an internal radial projection or projections of the latter drivingly engaged by a slotted-end window operating arm or torque rod or bar. In an alternative embodiment, the window operating power output is taken directly from the other or bearing member of the gear (which is drivingly keyed and staked to the drive half). This take-off may be had through the agency of an operating member or torque rod received in a square bore of the bearing member half of the worm gear.

In certain installations of the improved side-mounted operator, it may be found desirable to positively locate the latter on a window sill or equivalent support, as by means of a bottom projection on the operator casing structure received in a hole in the sill. In other installations, such locating provisions may not be in order. Therefore, in one alternative, the casing may have such a locating projection, pin or lug at its bottom, in the form of pin or lug halves die cast integral with the respective housing and cover members of the casing at the meeting plane of the respective members.

In another alternative, the projection may be in the form of a separate pin which is fixedly, though removably, located in registered recesses at the bottom of the casing halves, projecting downwardly of the latter for reception in the sill opening or hole referred to above. Thus, such separate pin may be omitted in the case of an installation in which a positive location of the operator on a sill is either not necessary or not desired.

While the foregoing description relates to a side-mounted operator, it will be evident to those familiar with the art that many, if not most or all, of the improved features of housing or casing construction, i.e., double-enveloping worm and gear structure as confined in said casing construction, also specific worm and worm gear and casing features, etc. are capable of being incorporated in a center-mounted operator such as is the subject matter of a copending application of Andrew J. Campbell and Robert L. Fischer, Ser. No. 463,994, filed June 15, 1965. The description and claims to follow should be construed accordingly.

The foregoing as well as other objects will become more apparent as this description proceeds, especially when considered in connection with the accompanying drawings illustrating the invention, wherein:

FIG. 1 is a view in elevation from one side of the improved operator of the invention, as mounted to and on the sill of a window or equivalent frame, shown in dot-dash line;

FIG. 2 is an end elevational view of the side-mounted operator, as seen from the right of FIG. 1, with alternative modes of connecting the output drive thereof to an awning or louver type window being illustrated in solid and dot-dash lines;

FIG. 3 is an elevational view of the operator from the side thereof opposite that depicted in FIG. 1;

FIG. 4 is an enlarged (double) scale view showing one of the halves, i.e., the housing half of the casing structure of the operator, along with associated worm and worm gear components, this view being a side elevation on the vertical plane of the surfaces at which the housing halves meet, or along line 4—4 of FIGS. 2 and 5;

FIG. 5 is an axial sectional view of the assembled operator along a line corresponding to the central vertical sectional line 5—5 of FIG. 4;

FIG. 5A is a composite or exploded view in axial cross section through the bearing gear half and driving gear half of a two-part worm gear unit employed in one embodiment of the operator, showing provisions whereby these halves are located in proper angular relationship to one another, prior to staking the same together to form a unitary gear structure;

FIG. 6 is a view in vertical section on broken line 6—6 of FIG. 4, showing the assembled housing or casing halves, but with the gearing omitted for simplicity;

Figure 12:
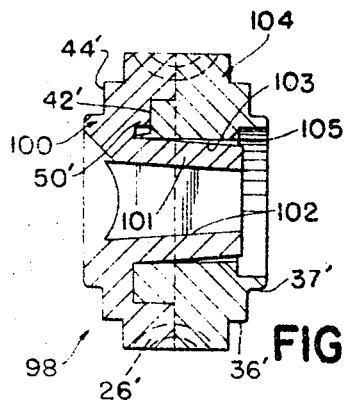
Figure 13:
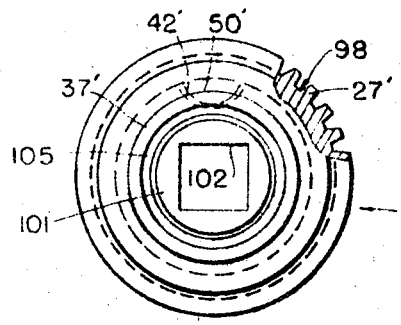

FIG. 12 is a view in axial section through an alternative type of two-part worm gear, prior to staking the driving and bearing gear halves together in a unitary form, in which embodiment the output of the gear is taken directly from the bearing gear half, rather than from the driving gear half, as in the embodiments of FIGS. 1 through 7; and FIG. 13 is an end elevational view of the gear of FIG. 12, as viewed from the right of that figure, being partially broken away and in section at 90° to the axis of the gear.

One embodiment of the operator of the invention is illustrated in FIGS. 1 through 7, being generally designated by the reference numeral 10. It is shown in FIGS. 1–5 as being operatively mounted fixedly to the horizontal sill part 11 (dot-dash line) of a window or equivalent mounting frame 12, in direct side-by-side relation to an upright side part 13 of the frame, usually at the right-hand side.

Basically, the operator 10 comprises a two-part housing or casing structure 15 composed of a housing member or half 16 abutting frame upright 12, and a cover member or half 17, these members meeting in flat-wise face-to-face engagement with one another at vertical inner surfaces which define the upright meeting plane 18; a two-piece worm gear, generally designated 20, made up of mated drive and bearing halves or parts 21, 22, respectively, hereinafter described in detail; and a driving worm 24 in double-enveloping meshing engagement with worm gear 20. This type of engagement is also known as a double-throated one. The housing member 16, cover member 17, worm gear drive part 21 and gear bearing part 22 are preferably die castings of zinc or other practically desirable die castable metal; while worm 24 is of steel; and the worm and gear, although shown with radial clearance in FIG. 4, are actually in area running contact with one another. Particular reference being had to FIGS. 4, 5, 5A and 9, and as best depicted in FIG. 5A, each of drive and bearing halves 21, 22 of worm gear 20, both circular in section, is cast to provide a less than 360° (FIG. 4) series of gear teeth formations 26 of approximately quadrant-shaped concave outline which, when the gear halves 21 and 22 are mated together, constitute the teeth 27 of gear 20, as shown in FIG. 5; these are of quasi-circular concave shaped cross section in a plane including the axis of the worm gear.

The drive gear half 21 is cast to provide a generally cylindrical, though slightly tapered side opening 29 of round, square, hexagonal or other sectional shape, having integral, diametrically opposed and axially elongated drive lugs 30 projecting inwardly thereof, as best shown in FIGS. 4, 5 and 5A.

Thus, with the operator 10 mounted to the window or like frame 10 in the manner illustrated in FIG. 2, a tubular operator shank 31, said shank being provided with a slotted end, may be drivingly engaged at the slots thereof with the lugs 30 of drive gear member 21; and a window operator, in the form of an arm 32 pinned at 33 to shank 31, is thus drivingly connected by the latter to the worm gear 20.

In certain installations in which the window or like panel (not shown) or a vertical series of such panels in a multiple awning, louver or jalousie installation, is or are individually of substantial stiffness or of limited length, a single operating arm 32 for each panel will suffice, coupled together in the usual manner in a multiple installation. In an installation of longer panel length, for example twelve inches or more, it may be desirable to provide operating arms 32 at both ends adjacent the frame uprights 13; and in this case an elongated torque rod 34 will be provided, having a slotted end driving connection to the lugs 30 of the drive gear half of worm gear 20 as schematically indicated in FIG. 2.

Again referring to FIGS. 5 and 5A, gear member or half 21 is, to the right of its outer gear tooth portion 35, radially stepped inwardly to a cylindrical shoulder 36 adapted to afford a side bearing for the worm gear in casing structure 15, as will be later described, then again stepped radially inward to an approximately cylindrical spacer shoulder 37 encircling the outer end of drive recess 29 of the gear half 21.

On the opposite side of the gear tooth portion 35, from the formations just described, drive gear member 21 is die cast to provide an axially projecting, generally cylindrical pilot shoulder or boss formation 40, which has an inner axial flared opening 41 for a purpose to be described. Further, the formation 40 has an outwardly concave, half moon-shaped recess 42 of limited circumferential extent, also for a purpose to be described.

In reference to the bearing member or half 22 of worm gear 20, reference again being had in particular to FIGS. 5 and 5A, it is die cast on its left-hand side to afford a generally cylindrical, axially projecting pilot shoulder or boss formation 44 adjoining its circumferentially outer toothed portion 45; which pilot member may be internally dished at 46.

On its right-hand side (FIGS. 5 and 5A), bearing gear half 22 has an axial projection 47 which is provided with a generally cylindrical bore 48, for a purpose to be described, the projection 47 extending through a generally cylindrical, axial recess 49, which recess is sized in diameter to have snug mating fit about the projecting pilot shoulder formation 40 of the other gear half 21.

Finally, the left-hand gear part 22 is die cast to provide a half moon-shaped register lug 50 projecting radially into the side recess 49 thereof, the lug 50 being sized and shaped to have snug mating engagement in the half-moon recess 42 of gear part 21. The location of lug 50 and recess 42 on the respective gear parts 22 and 21 is such that, as thus engaged, the quadrantal tooth formations 26 of those parts are in accurate axial register, thus to complete the teeth 27 of gear 20 when the parts 21 and 22 are telescoped axially onto one another at the respective shoulder and recess formations 40 and 49, i.e., in the final relationship depicted in FIG. 5.

As thus assembled, gear halves 21 and 22 are fixedly connected to one another, as by staking the tubular projection 47 radially outwardly into the flared opening 41 of gear half 21, as indicated at 52 in FIG. 5. In the alternative, this connection might well be made using a self-threading screw, for example, when it is desired to attach an arm or other member to the gear at its axis.

It is to be observed that the recessing at 29 and 46 of the drive and bearing parts 21, 22, respectively, of worm gear 20 represents a cost-reducing economy of die cast metal, without significant sacrifice of strength or ruggedness. The parts, as mated, piloted or located and secured together in the manner above referred to, and as being further contained in ways to be described, are amply strong for their function.

The operator 10 of FIGS. 1–9 is intended for use in an installation in which a full opening and closing of the window or other panel is intended to be accomplished in a less than 360° rotation of worm gear 20, the worm and gear ratio being such as to produce an ample panel swing. Hence the teeth 27 of the gear 20 extend a bit more than 180° (FIG. 4) about the gear periphery, end teeth being stopped at the limits of gear rotation by internal means (to be described) of the operator casing 15. However, a full 360° or more rotation, using a full gear tooth complement without stopping, is of course possible, as in the embodiment of FIGS. 12 and 13, to be described later.

Figure 9:
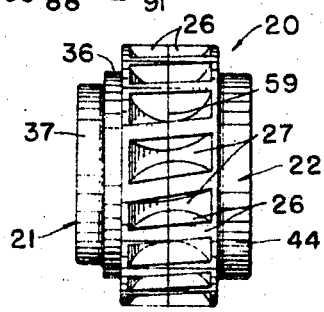
FIG. 9 is a side elevational view of the assembled worm gear of the embodiment, as produced by die casting of its two halves.

FIG. 9 of the drawings represents a side elevational view of the two-part worm gear shown also in assembled form in FIGS. 4 and 5. Manifestly, this view might also represent a side elevation of a gear having a full complement of teeth about its periphery; and the meeting plane of the two gear halves 21 and 22 is generally denoted 59 in FIG. 9. As indicated above, the gear 20, characterized as it is by the radially outwardly concave teeth 27, is die cast in two parts in order to clear or strip from the two die cavities of a conventional casting machine.

Figures 10, 11:
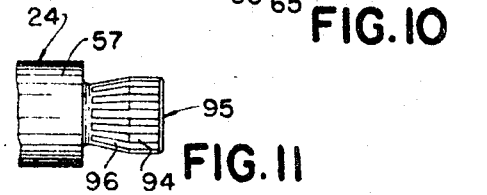
FIG. 10 is a fragmentary view in axial section through a one-part or integral worm gear of an alternative sort, showing a tooth contour having side draft which will enable the gear to be produced in one piece by die casting.
FIG. 11 is a fragmentary side elevational view showing an improvement in the steel worm of the invention, involving the provision of a mildly tapered relief of the worm shaft at an end thereof to afford a valuable improvement in the broaching technique by which a splined outer end of the shaft is produced.

However, FIG. 10 of the drawings shows an alternative worm gear embodiment which is capable of being die cast in one piece, still providing for the use of a double-enveloping worm. In this case the gear is generally designated by the reference numeral 60, being recessed at 61 on its driving or output end for the reception of an operator shank or torsion rod (not shown). Like the gear 20, its cylindrical end shoulders 62 and 63 have rotatable journaling in a casing similar to the casing 15. As cast on an outer peripheral portion 64 of worm gear 60, the teeth of the latter have an inner, approximately quadrantal half tooth formation 65 which merges into a horizontal tooth formation 66 facing axially of the gear.

Thus, having been provided with proper draft at 66 for the purpose, the special gear 60 may be die cast as one piece in a conventional two-part die casting cavity.

Before passing to a description of features of the housing and cover halves 16, 17 of the operator's casing 15, it should be noted, with reference to FIG. 4, that the steel worm 24 has a cylindrical pilot journal end 54 at one axial side of its enveloping tooth helix 55 and a cylindrical bearing waist portion 56 directly at the opposite side of the helix. Outwardly of waist 56 the worm has an enlarged shaft or shank portion 57 for connecting the same to a handle or crank (not shown) in an improved manner.

Figure 7:
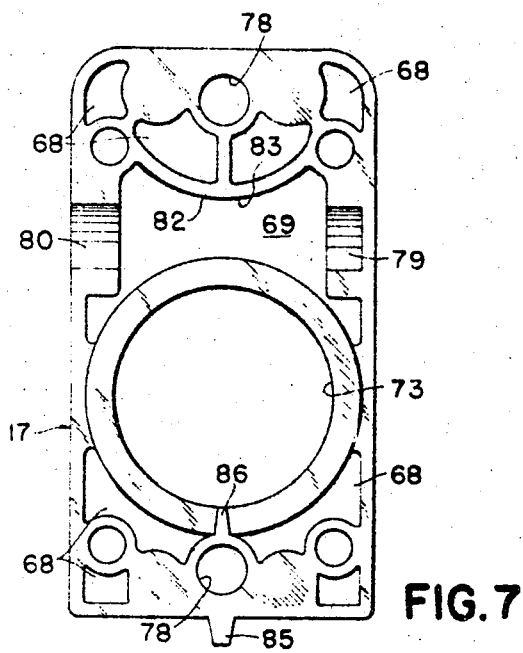
FIG. 7 is a view in vertical section on line 7—7 of FIGS. 2, 5 and 6, showing the second or cover half of the casing structure, associated worm and gear means being omitted for clarity of comparison with FIG. 4.

Structural features of the casing 15 of operator 10 are best shown in FIGS. 4, 5, 6 and 7; and it will be noted that the dies (not shown) in which its housing and cover parts 16, 17 are cast should be shaped to afford a generous recessing of both casing members from the meeting plane 18 thereof. The various cavities in the respective parts, all designated by the reference numeral 68, enable a great conservation of the mass of die cast metal needed for the improved operator, and a lessened total cost of production thereof without sacrifice of strength. This is one of the basic practicalities of the invention, just as in the case of the recessed, two-part gear 20. The cavity between the casing halves which receives gear 20 and worm 24 is denoted 69 (FIGS. 6 and 7).

As shown in FIGS. 4 and 6, the housing half 16 of casing 15 is cast to provide, adjacent each of its four corners, integral, laterally extending staking projections 70, which projections pass through aligned holes 71 in casing cover member 17 (FIG. 6). The ends of the projection 70 are, as a final step in the securement of the casing halves 16 and 17 together, staked over, as indicated in dotted line at 72. This is done as a simultaneous staking operation at all four points, thus contributing to a low cost of production, in point of time.

FIGS. 6 and 7 show the cover member or half 17 of casing 15 as being provided with an enlarged circular journal opening 73 through its side wall 74; and the annular bearing or journal shoulder 36 of the worm gear 20 runs with fairly close tolerance in this opening.

Similarly, FIGS. 5 and 6 show the other or housing member half 16 of casing 15 as provided with an enlarged circular opening 76 through its side wall 77, in alignment with the opening 73; and opening 76 journals the annular pilot or locating shoulder 44 of worm gear half 22, as shown in FIG. 5, also with reasonable running tolerance for gear 20.

Reference being had to FIGS. 4 and 5, each of the casing members 16 and 17 is provided, adjacent its top and bottom center points, with a pair of countersunk holes 78, for the reception of appropriate screw or rivet means (not shown) by which the operator is fixedly secured to the upright member 12 of the window or equivalent frame 10.

As shown in FIG. 7, each of the housing and cover members 16, 17 has a semi-cylindrical blind recess 79 adjacent one side thereof, and a further, axially aligned semi-circular through-recess 80 at the opposite side thereof; and, with the casing halves assembled, the recesses in question form journals respectively receiving the cylindrical pilot end 54 and bearing waist 56 of the steel worm 24, with the shaft 57 proper of the worm running adjacent the outer side surface of the casing 15, as shown in FIG. 4.

Reference has been made to the fact that internal formations of the casing halves 16, 17 serve the purpose of outwardly backing up the worm 24 against reactive thrust exerted thereon by worm gear 20, such thrust having the effect of springing or separating the worm from the worm gear teeth on a common radius of worm 24 and gear 20. In this connection, reference is invited to FIGS. 4 and 7 of the drawings.

Thus, each of the casing halves is cast to provide an integral formation 82 of the full transverse depth of that half, which formation has a lower, convexly arcute surface 83; and the curvature of this surface conforms to the concave line of curvature of the worm helix 55 as shown in FIG. 4.

There is a good running clearance between the surface 83 and the external helix outline at 55 to permit normal rotation of worm 24 without rubbing or binding; however, the casing formation at 82 will back up the worm 24 against a tendency to spring or separate away from the worm gear 20 under a reactive load applied by the latter to the worm.

Accordingly, and as indicated above, the inherent action of the double-enveloping worm and gear unit in receiving and containing axial thrust as between worm and gear, hence in resisting axial separation of worm gear halves 21, 22, is supplemented by the backing up and containing action of the housing formation 82 on the worm at the convex surface curvature at 83.

Finally, each of the casing halves 16 and 17 is cast to provide, at the bottom thereof and adjoining its meeting face, a half of a downward, frusto-conical projection 85 which is receivable in an opening in the frame sill 11 (as shown in FIGS. 1, 2 and 3) thus to properly locate operator 10 in regard to the frame, when such locating provisions are deemed in order.

Each casing half 16, 17 is also cast to provide, directly above its bottom central screw or rivet holes 78, a stop finger 86 which projects radially into the housing cavity 69 in the space between endmost worm gear teeth 27, as illustrated in FIG. 4, thus to limit extremes of rotation of gear 20.

Locating provisions, such as pin 85, are not always in order or desirable; and in such instances, the invention contemplates means by which the integrally die cast projecting formation 85 may be optionally eliminated.

Figure 8:
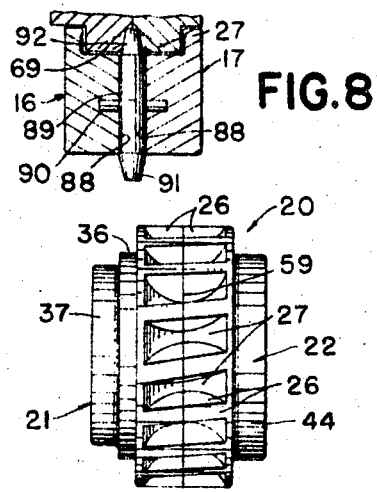
FIG. 8 is a fragmentary view in vertical transverse section generally similar to FIG. 5, showing a provision alternative to that of FIGS. 1 through 7, in regard to a removable bottom pin for the operator to engage in a locating opening in the window sill, in the event that such provision is in certain instances not desired.

FIG. 8 of the drawings illustrates an arrangement for this purpose, in which each of the housing halves 16 is cast at the bottom and at the meeting face thereof, with a semi-cylindrical vertical recess 88 extending upwardly into the casing cavity 69 in which worm gear 20 rotates, so that a vertically elongated locator and stop pin 89 may be positioned in the bore afforded by the recesses 88; and may be located and to some degree interlocked in relation to the housing and cover members 16, 17 by means of a further transverse pin 90 extending through locator and stop pin 89. A lower projecting end 91 of pin 89 will serve the function of the die cast projection 85 of FIGS. 1 through 7; while an upper projecting end 92 of pin 89 extends into the cavity 69, serving as an equivalent of the stop 86 of the other embodiment. In instances in which no sill-engaging locating means are desired, the pin 89 may simply be omitted. Of course, in an adaptation such as that shown in FIG. 8, it is impossible to have a center screw or rivet hole through the casing halves 16, 17 at the bottom thereof; and it will therefore be necessary to mount the operator to the frame otherwise, for example by a pair of through holes adjacent its bottom corners.

FIG. 11 shows a detail of the worm 24 adjacent and axially outwardly of the shaft extension 57 thereof. Ordinarily, such shaft extension is broached to provide a spline which is matingly engaged by an operating handle or crank for a driving connection to the worm; and it is customary to provide an axially short and relatively abrupt relief of the splined portion, where it integrally adjoins the shaft, for the purpose of broaching the spline. Thus, the broaching tool cuts the spline teeth in a uniform radial depth through the full axial length of the spline formations. This results in frequent breakage or damage to the broach tool, due to the heavy material-removing load imposed thereon in the normal procedure.

However, in accordance with the present invention, and as illustrated in FIG. 11, the main, outer end portion 94 of the splined shaft end 95 is shown as merging very gradually through a mildly conical relief portion 96 with the worm shaft 57, proper. The result is that, in broaching, the tool has to remove a full spline-depth of steel only throughout the partial axial length of the spline portion 94, and is greatly removed of this load in splining only partial depth throughout the remaining, mildly relieved and more than half length portion 96. The result is an increased length of operational life of the broaching tool, i.e., much less frequent replacement or reworking of the same, meaning much less machine down time and, in consequence, a considerably decreased cost of production of the worm 24 and the operator 10 as a whole.

FIGS. 12 and 13 illustrate an embodiment, generally designated by the reference numeral 98, of a worm gear which may be employed as an alternative to the first embodiment of two-part worm gear 20. Gear 98 is also a dual-piece one, having structural features somewhat similar to gear 20. Hence, to the extent that such features correspond, they are designated by corresponding reference numerals, primed; and further description is dispensed with.

In the first place, the composite gear 98 has a full, 360° complement of teeth 27', as indicated in FIG. 13, although it may also be of a mutilated type, as gear 20 is.

In differentiation from the gear 20, in which drive of a window operating arm or torque rod is taken directly from the drive gear member 21, such drive is taken directly from the bearing member of gear 98, which member is generally designated by the reference numeral 100. To this end, member 100 is integrally cast to provide a mildly frusto-conical, tubular side extension 101, the bore 102 of which is correspondingly frusto-conical. Like the bore 29, bore may be round, square or hexagonal in shape, or of any other desired outline.

Extension 101 is a staking projection, which extends through a coaxial bore 103 of the second gear member, generally designated 104; and with the parts 100 and 104 registered and mated in flat-wise, face-to-face engagement with one another (FIG. 12), a suitable tool is employed to expand the extension 101 into staking and clinching engagement with a conical seat 105 on member 104 outwardly adjoining the bore 103 of the latter.

As indicated in FIG. 13, the bore 102 of extension 101 of the worm gear 98 is shown square in shape, and will receive a window operator torque rod of corresponding square cross section for a driving connection of gear 98 to the window or other panel or panels.

Otherwise, the modified gear 98 has structural features corresponding to those of the earlier embodiment, has corresponding advantages of low cost of production, of strength and ruggedness, and the like.

It is to be seen from the foregoing that the invention affords improvements in a side-mounted operator for windows or equivalent panel units which is of extremely low cost in regard to the production and assembly of its parts; which has built-in inherencies of strength and ruggedness, notwithstanding its die cast nature, due to features of its casing structure, etc. As indicated above, although primarily designed for a side-mounted installation (per FIGS. 2 and 5), it is evident that improved features thereof may also be embodied in an operator such as is shown and described in the Campbell et al. application identified above. Furthermore, while the embodiment of the worm gear 60 illustrated in FIG. 10 is a one-piece gear, having side draft at 66 paralleling its axis, and only quadrant-shaped tooth formations at 65, it is, nevertheless, as meshingly engaged at the last named portion, in double-enveloped relationship to the worm 24. Accordingly, in the claims to follow, references to a "double-enveloping type" are to be construed as applying to the one-piece gear 60 as well as to the two-part gear 20.

What we claim as our invention is:

1. An operator of the type described for windows and like operated parts, comprising a casing, and worm gearing rotatably mounted within said casing, including a worm gear and a worm which are in double-enveloping drive engagement with one another, said worm gear having means to drivingly connect the same to the operated part, said casing including housing and cover parts secured in face-to-face meeting engagement with one another, said worm gear being of die cast construction, said casing parts also being die-cast and having aligned openings in transversely spaced walls thereof which rotatively receive said worm gear, each casing part being provided with aligned recesses at the zone of meeting engagement of the parts, in which recesses said worm is rotatively received, said casing parts having transversely aligned recesses at the bottom thereof and at said zone meeting engagement thereof, and a downwardly projecting locating pin removably received in said last named recesses.

2. An operator of the type described for windows and like operated parts, comprising a casing, and worm gearing rotatably mounted within said casing, including a worm gear and a worm which are in double-enveloping drive engagement with one another, said worm gear having means to drivingly connect the same to the operated part, said casing including housing and cover parts secured in face-to-face meeting engagement with one another, said worm gear being of die cast construction, said casing parts also being die-cast and having aligned openings in transversely spaced walls thereof which rotatively receive said worm gear, each casing part being provided with aligned recesses at the zone of meeting engagement of the parts, in which recesses said worm is rotatively received, said worm gear comprising a pair of die cast parts meeting in a plane at 90° to the axis of the gear, said casing having an internal formation adjacent the outer enveloping outline of the worm, as the latter meshes with the worm gear to laterally restrain the worm against outward side thrust by the gear.

3. The operator of claim 2, in which one of said worm gear parts has an axially opening recess provided with means to drivingly engage an output member, said gear parts having portions matingly engageable to register tooth formations of the respective parts angularly relative to one another, one of the casing parts having a plurality of integral side projections received in holes of the other casing part to stake the housing and cover parts together from a single side of the casing.

References Cited

UNITED STATES PATENTS

| 2,539,387 | 1/1951 | Alden | 287—53 |
| 3,319,482 | 5/1967 | Campbell et al. | 74—425 |

FOREIGN PATENTS 204,850  8/1959  Austria.

OTHER REFERENCES

Doehler, H. H., Die Casting. New York, McGraw-Hill, 1951, p. 184.

Logue, Charles H., American Machinist Gear Book. New York, McGraw-Hill Book Co. Inc., 1922, pp. 183–4.

The New Jersey Zinc Company, Practical Considerations in Die Casting Design, New York, Marbridge Printing Co. Inc., 1948, p. 112.

FRED C. MATTERN, JR., *Primary Examiner.*

F. D. SHOEMAKER, *Assistant Examiner.*